Patented Aug. 27, 1929.

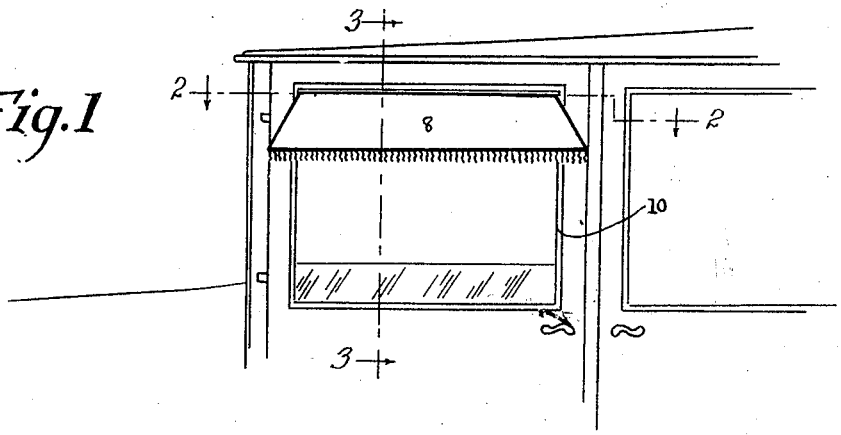
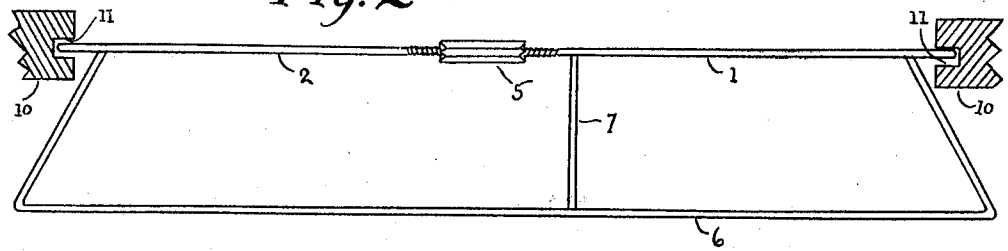
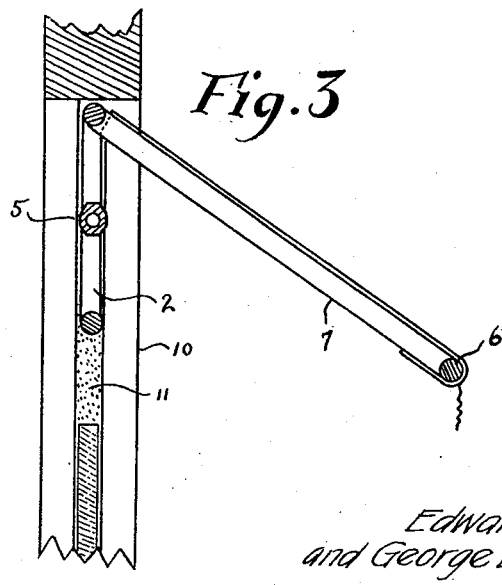

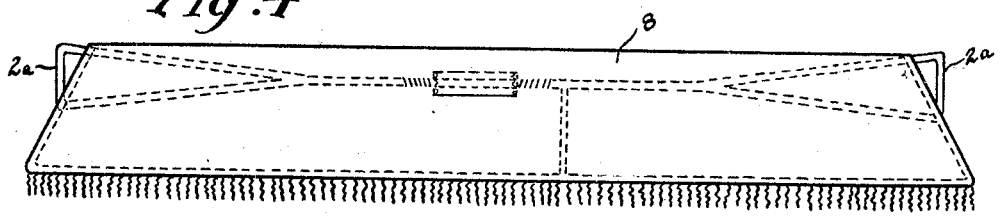
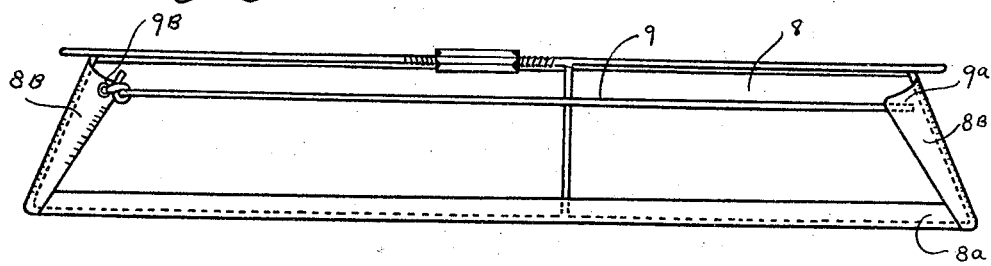
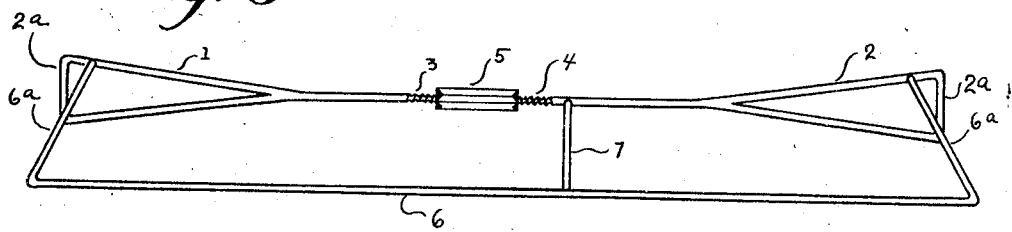

1,726,355

UNITED STATES PATENT OFFICE.

EDWARD WASHINGTON KLOS AND GEORGE EDWARD KLOS, OF MUSKOGEE, OKLAHOMA.

AWNING.

Application filed September 3, 1926. Serial No. 133,442.

This invention relates to awnings, and more specifically to awnings of that type particularly adapted for use on automobiles.

It is the object of the invention to provide an improved awning of attractive appearance and great strength, having an adjustable frame whereby it is capable of quick and easy installation in and removal from windows of various sizes, and having a cover provided with means to automatically hold the same taut on said frame.

Other objects and features of the invention will be apparent from the following description and the accompanying drawings, in which Fig. 1 is a fragmentary view of an automobile with the awning installed in the window thereof. Fig. 2 is a section on the line 2—2 of Fig. 1. Fig. 3 is a section on the line 3—3 of Fig. 1. Fig. 4 is a front elevation of the awning detached from the window. Fig. 5 is a plan view of the awning. Fig. 6 is a front elevation of the frame.

Referring specifically to the drawings, the frame has two oppositely extending window frame engaging members 1 and 2, substantially triangular in shape and provided with screw threaded portions 3 and 4, respectively. The screw threaded portions 3 and 4 are adjustably connected together and held in spaced relation with respect to each other by right and left threaded turnbuckle 5. Ends 6ª of angular bar cover supporting member 6 are carried by the members 1 and 2, as shown. The frame may also, if desired, be provided with a brace 7.

The cover 8 is secured to cover supporting member 6 by means of turn back pocket 8ª and flared lap over parts 8ᵇ, the parts 8ᵇ being adjustably connected together by means of elastic strap 9 fixed to one of said parts 8ᵇ as at 9ª and adjustably secured to the other of said parts 8ᵇ as in eyelet 9ᵇ.

Figs. 1, 2 and 3 illustrate the application of the awning to the window of an automobile of the closed body type. The window frame of the automobile body is indicated at 10 and the sash groove thereof at 11.

To install the awning in a window, the turnbuckle is turned to draw the members 1 and 2 toward each other to such an extent that they can be slipped in the grooves 11. The turnbuckle is then rotated in the reverse direction and the members 1 and 2 are thereby forced apart and into frictional engagement with the grooves 11 to support the awning in the window. The base portions 2ª of said members snugly fit in said grooves to rigidly support the awning. When removal of the awning is desired, the turnbuckle is turned again to draw the apices of members 1 and 2 toward each other and out of contact with the grooves 11, after which the awning can be easily removed.

The movement of the members 1 and 2 toward each holder is attended by a corresponding movement of the ends 6ª of bar cover supporting member 6. And an ordinary cover would thereby be made slack on its support. That the cover should at all times be taut and the various objectionable results of slack eliminated, needs no explanation. By means of the elastic strap 9, the cover 8 is kept taut upon support 6 when the ends 6ª thereof are drawn together, the flared lap over parts 8ᵇ slipping around ends 6ª. The strap may be adjusted, as hereinbefore stated, by securing the free end thereof in eyelet 9ᵇ.

It will be seen from the foregoing that the invention provides an awning of few and simple parts that can be cheaply manufactured and used easily and effectively, and which will stand up under the most severe use.

The invention can be used in various ways other than in connection with the window of a closed car. Thus, for example, suitable brackets can be provided on an open car to receive the members 1 and 2. It will be understood that the awning can be applied to any window, or the like, having two surfaces adapted to be frictionally engaged by the said members.

The invention is not limited to the particular form and application shown, but various modifications and changes are possible within the scope of the following claim.

We claim:

An awning for vehicle windows having vertical pane guide slots, said awning having a frame formed of a single length of wire bent into an elongated rectangular formation including an upper horizontally disposed bar having oppositely disposed threaded ends, frame supporting arms secured at an angle to the ends of said bar and adapted to enter said slots, and a turnbuckle engaging said oppositely disposed threaded ends to force the frame supporting arms into frictional engagement with the walls of said slots, to support the frame.

In testimony whereof, we affix our signatures.

EDWARD WASHINGTON KLOS.
GEORGE EDWARD KLOS.